(12) United States Patent
Nishitsuji

(10) Patent No.: US 8,640,847 B2
(45) Date of Patent: Feb. 4, 2014

(54) PACKAGING APPARATUS

(71) Applicant: Ishida Co., Ltd., Kyoto (JP)

(72) Inventor: Satoshi Nishitsuji, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 13/674,168

(22) Filed: Nov. 12, 2012

(65) Prior Publication Data

US 2013/0118860 A1    May 16, 2013

(30) Foreign Application Priority Data

Nov. 15, 2011   (JP) .................................. 2011-249808

(51) Int. Cl.
*B65G 11/00* (2006.01)
*B65G 11/02* (2006.01)

(52) U.S. Cl.
CPC .................................... *B65G 11/023* (2013.01)
USPC .......................... 193/2 R; 193/2 B; 198/550.2

(58) Field of Classification Search
CPC ........................................................ B65B 9/20
USPC .............. 198/533, 550.2; 222/199, 202, 203, 222/238, 239; 221/183, 203, 222, 237
See application file for complete search history.

(56) References Cited

U.S. PATENT DOCUMENTS

| | | | | |
|---|---|---|---|---|
| 2,735,531 | A * | 2/1956 | Spivey | 193/2 R |
| 4,342,383 | A * | 8/1982 | Burnett | 193/32 |
| 4,446,992 | A * | 5/1984 | Suzuki et al. | 222/196 |
| 4,652,946 | A * | 3/1987 | Ryan | 360/85 |
| 6,119,438 | A | 9/2000 | Bacon et al. | |
| 8,424,671 | B2 * | 4/2013 | Tokuda | 198/533 |

FOREIGN PATENT DOCUMENTS

JP    11-049104 A    2/1999

OTHER PUBLICATIONS

Extended European Search Report of the corresponding European Patent Application No. 12192254.6, dated Mar. 6, 2013.

* cited by examiner

*Primary Examiner* — Gene Crawford
*Assistant Examiner* — Lester Rushin
(74) *Attorney, Agent, or Firm* — Global IP Counselors, LLP

(57) ABSTRACT

A packaging apparatus includes a chute, a moving member, and a control unit. The chute encloses a passage space, and has a slit formed in a first portion. Items to be packaged are supplied from an upper apparatus to the passage space. The first portion surrounds a first space. The first space is part of the passage space, where the items targeted to be packaged, readily become clogged. The moving member is configured to move into the first space and withdraw from the first space through the slit. The control unit causes the moving member to enter the first space after the items targeted to be packaged have passed through the first space.

6 Claims, 9 Drawing Sheets

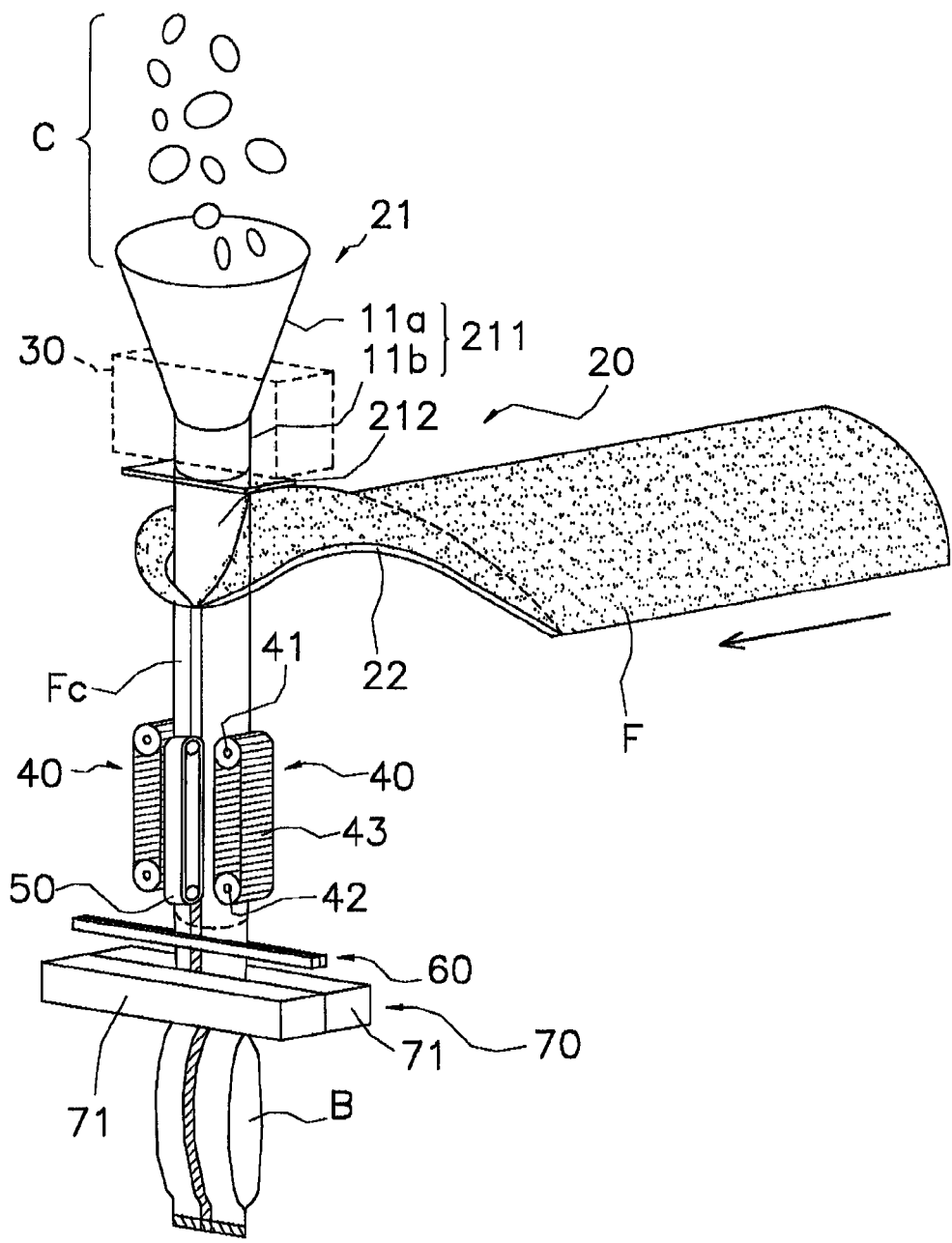
F I G. 2

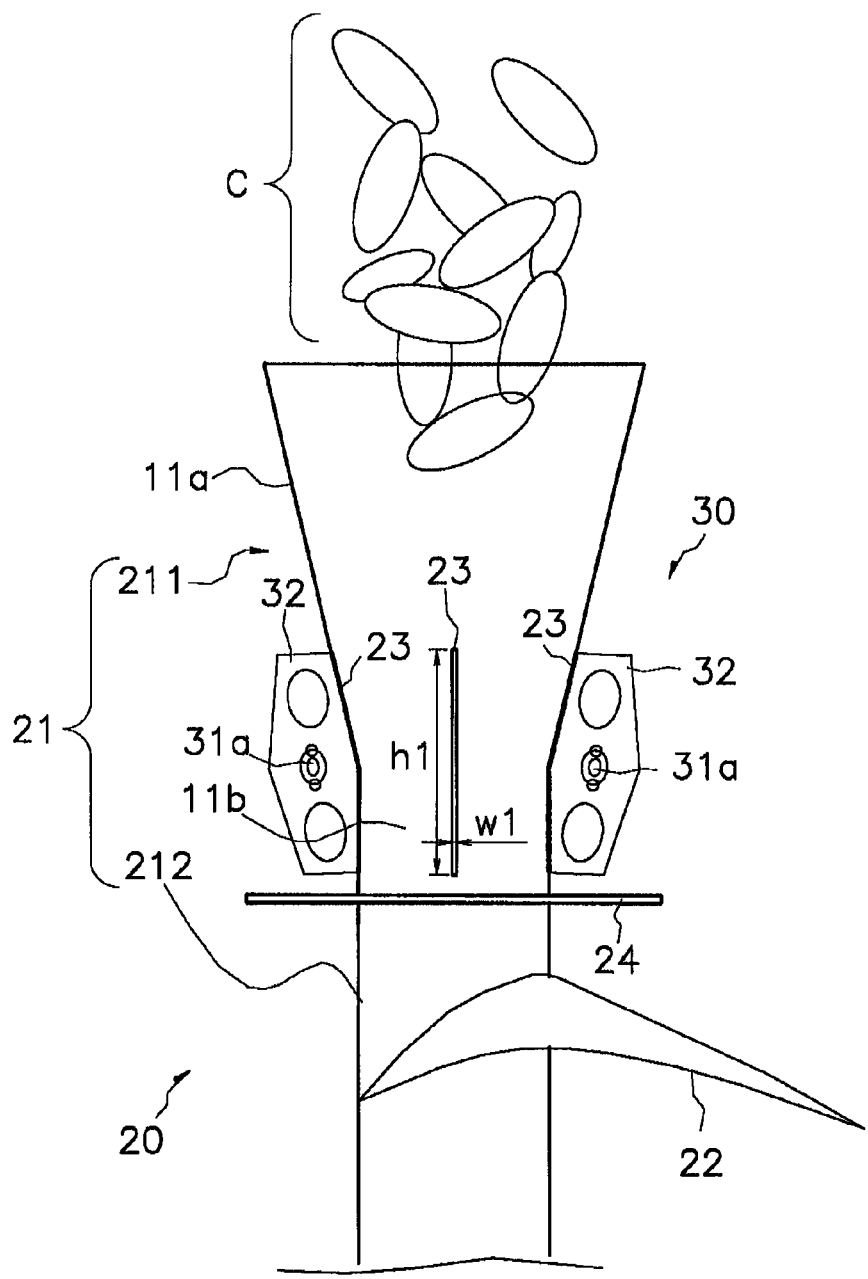
F I G. 3

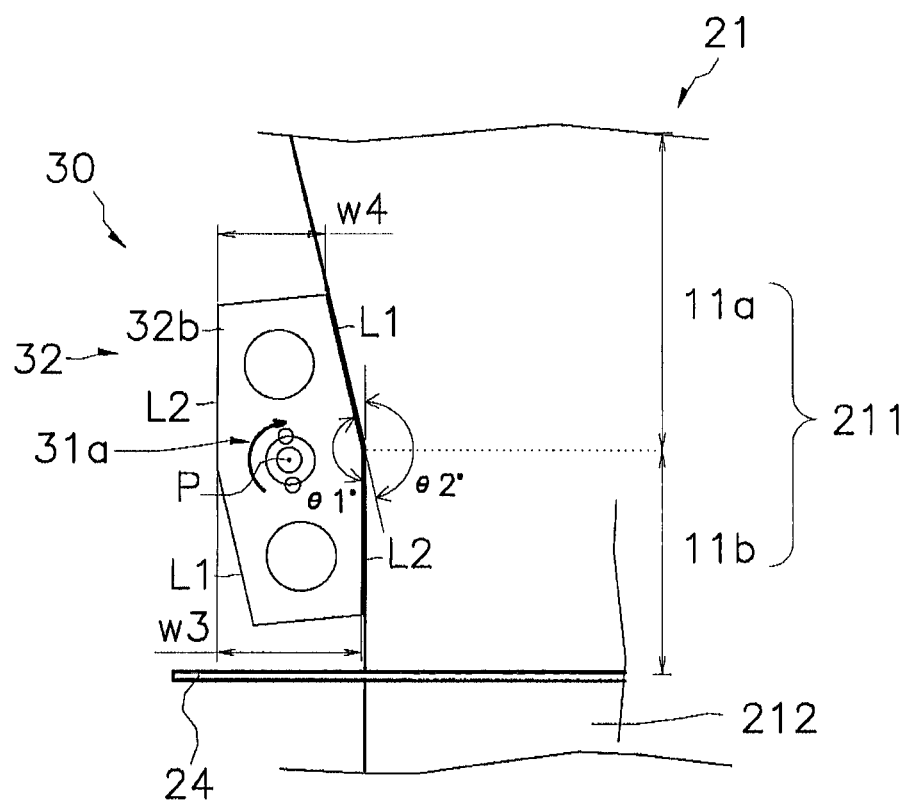
F I G. 6

PACKAGING APPARATUS

TECHNICAL FIELD

The present invention relates to a packaging apparatus.

BACKGROUND

In conventional practice, there are known packaging apparatuses which form bags from belt-shaped films and package articles in the bags. Such a packaging apparatus forms a belt-shaped film into a cylinder while conveying the film downward, and seals the bottom end of the cylindrical film. The packaging apparatus then drops articles into the cylindrical film that is sealed at the bottom end, and seals the top end of the cylindrical film to form a bag.

However, when articles are dropped through a chute into a cylindrical film sealed at the bottom end, the articles sometimes get clogged in the chute. In view of this, a packaging apparatus comprising a pushing member is proposed in Japanese Laid-open Patent Application No. 11-49104, for example. The pushing member protrudes into the chute through the top of the chute by swinging, and forces the articles clogged in the chute to fall into the cylindrical film.

SUMMARY OF THE INVENTION

Technical Problem

However, because the packaging apparatus described above has a configuration in which the pushing member is swung and made to protrude into the chute, time is required for the pushing member to be driven in a reciprocating manner. As a result, it is difficult to cause the packaging apparatus to be capable of high-capacity operation.

An object of the present invention is to provide a packaging apparatus whereby the clogging of articles in the chute can be suppressed, and the packaging apparatus can be operated with a high capability.

Solution to Problem

The packaging apparatus according to the present invention comprises a chute, a moving member, and a control unit. The chute defines a passage space that directs items from an upper end of the chute to a lower end of the chute, where the items are packaged. The items are supplied from an upper apparatus into the passage space. The chute has a first portion located between the upper end and the lower end with a slit formed therein. The first portion defining a first space where items to be packaged readily become clogged, the first space being part of the passage space. The moving member is coupled to an exterior surface of the chute corresponding to the first portion for movement into the first space and out of the first space through the slit. The control unit is operably connected to the moving member controlling movement of the moving member into the first space after the items to be packaged have passed through the first space.

Clogging of articles in the chute interior can thereby be reduced, and the packaging apparatus can be operated with a high capability.

Furthermore, the packaging apparatus according to the present invention preferably includes a rotation mechanism. The rotation mechanism rotatably supports the moving member. The rotation mechanism selectively rotates the moving member in one direction, such that the moving member enters the first space and withdraws from the first space in response to signals from the control unit.

The moving member can thereby be made to enter the first space and withdraw from the first space in a short amount of time. As a result, the performance of the packaging apparatus is improved.

The chute preferably has a cylindrical part and a funnel part that extend in a vertical direction. The funnel part is connected to the cylindrical part defining a connecting part at the intersection of the cylindrical part and the funnel part. The funnel part defines a receiving part having a larger cross-sectional area than that of the cylindrical part, the slit being formed in the first portion and extending vertically along the connecting part.

The moving member can thereby be moved in a short amount of time into the portion of the chute where articles clog readily.

The control device preferably is configured selectively operate the rotation mechanism such that the moving member is moved into and out of the first space. The control device is also configured to cease operation of the rotation mechanism such that the moving member is maintained in a stopped position.

The moving member can thereby be made to enter the first space with the proper timing after the items targeted to be packaged have passed through the first space.

Preferably, with the moving member in the stopped position, the moving member blocks 50% or more of an opening defined by the slit.

The items targeted to be packaged can thereby be suppressed to scatter to the outside of the chute.

A plurality of the moving members are preferably provided in the periphery of the chute.

Clogging of the items targeted to be packaged can thereby be resolved from multiple locations inside the chute.

Furthermore, the moving member is preferably a plate-shaped member having a first surface for blocking the slit. The rotation mechanism preferably rotates the moving member about the longitudinal direction center of the plate-shaped member.

The performance of the packaging apparatus can thereby be improved.

Preferably, the first surface of the plate-shaped member is a side surface, and also preferably the plate-shaped member has a front surface and a rear surface. The front and rear surfaces have a side along the outer contour of the chute.

The slit can thereby be blocked effectively.

The moving member is preferably the plate-shaped member having a side surface and front and rear surfaces. The side surface is adapted for blocking the slit and the front and rear surfaces have a point-symmetrical shape as an outer contour. The rotational center of the rotation mechanism is preferably provided to the center point of the point-symmetrical shape of the plate-shaped member, and the rotation mechanism preferably rotates the moving members 180°.

Since the moving member is caused to perform a semi-rotation, thereby enabling the moving member to be changed to the stopped orientation, the operating speed of the moving members can be increased, and the performance of the packaging apparatus can be improved.

Advantageous Effects of Invention

With the packaging apparatus according to the present invention, clogging of articles in the chute interior can be reduced, and the packaging apparatus can be operated with a high capability.

BRIEF DESCRIPTION OF THE DRAWINGS

FIG. 2 is a schematic perspective view showing the configuration of a form-fill-seal machine;

FIG. 3 is a drawing showing the shaping mechanism and the pushing mechanism;

FIG. 6 is a drawing showing the rotating member in a stopped position;

DESCRIPTION OF EMBODIMENTS

Figure 1:
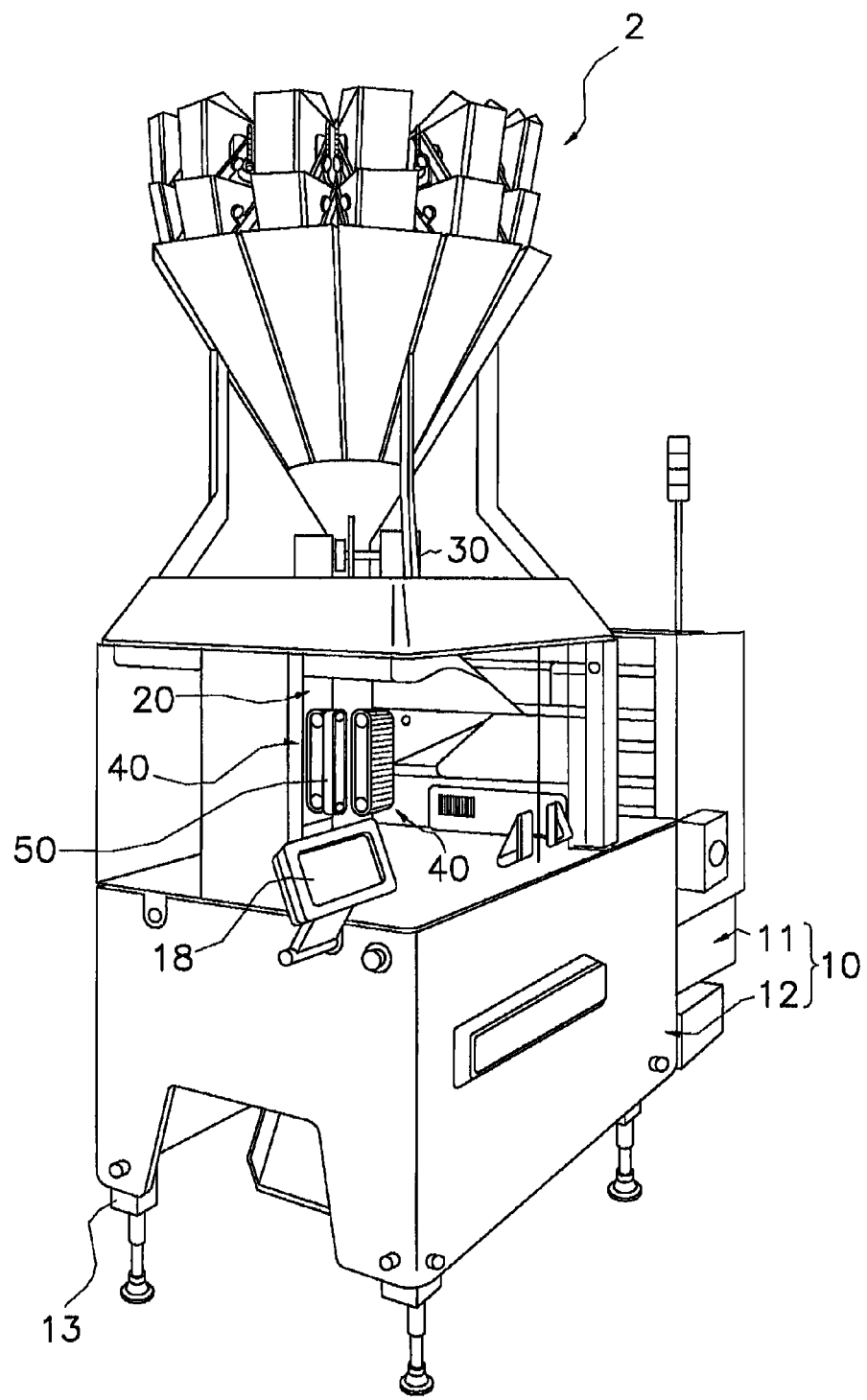
FIG. 1 is an external perspective view of a form-fill-seal machine.

The following is a description, made with reference to the drawings, of a form-fill-seal machine (packaging apparatus) 10 according to the present embodiment. The following description, being one example of the present invention, does not limit the technological scope of the present invention.

(1) Overall Configuration

First, the overall configuration of the form-fill-seal machine 10 according to an embodiment of the present invention will be described using FIG. 1. The form-fill-seal machine 10 is an apparatus for forming bags B from a film F and bagging snack foods or other articles C in the bags B (see FIG. 2).

The form-fill-seal machine 10 mainly comprises a film supply unit 11 and a form-fill-seal unit 12. The form-fill-seal machine 10 also comprises a control unit 7 which is connected with these structures and which conducts the communication of various signals (see FIG. 9).

The film supply unit 11 supplies the film F to be made into the bags B to the form-fill-seal unit 12. The form-fill-seal unit 12 is the main component for bagging the articles C. The articles C bagged by the form-fill-seal unit 12 are measured out using a combination weighing apparatus (equivalent to the upper apparatus) 2 which is disposed above. The combination weighing apparatus 2 is an apparatus for supplying a predetermined weight of articles C to the form-fill-seal unit 12. The combination weighing apparatus 2 measures out the articles C using a plurality of hoppers. The combination weighing apparatus 2 determines the combination of hoppers so that the total of the hopper measured-out value reaches a predetermined weight. Based on the determination results, the combination weighing apparatus 2 sequentially ejects articles C from the hoppers which accommodate articles C in a predetermined weight, and supplies the articles C to the form-fill-seal unit 12. The form-fill-seal unit 12 bags the articles C in accordance with the timing at which the articles C are supplied from the combination weighing apparatus 2. In the present embodiment, the action of packaging the supplied articles C and manufacturing bags B constitutes one cycle. The form-fill-seal machine 10 manufactures 150 bags B per minute.

The form-fill-seal machine 10 comprises a display 18. The display 18 is covered by a touch panel, and the display 18 also functions as an input part for the user to perform various settings relating to the form-fill-seal machine 10. The configuration of the units included in the form-fill-seal machine 10, are described in detail hereinbelow with reference to FIGS. 1 through 11.

(2) Film Supply Unit

The film supply unit 11 is a unit for supplying the sheet-shaped film F to a shaping mechanism 20 of the form-fill-seal unit 12 which is described hereinafter. The film supply unit 11 is provided adjacent to the form-fill-seal unit 12 as shown in FIG. 1. A film roll is set in place in the film supply unit 11. The sheet-shaped film F is wound around the film roll. The film F is unwound from the film roll and supplied to the hereinafter-described shaping mechanism 20.

(3) Form-Fill-Seal Unit

The form-fill-seal unit 12 manufactures bags (products) B filled with articles C while shaping a cylinder from the sheet-shaped film F fed from the film supply unit 11. The form-fill-seal unit 12 is configured to mainly comprise the shaping mechanism 20, a pushing mechanism 30, a pull-down belt mechanism 40, a longitudinal sealing mechanism 50, a shutter mechanism 60, a transverse sealing mechanism 70, and a support frame 13 for supporting these mechanisms, as shown in FIG. 1 or 2.

(3-1) Shaping Mechanism

The shaping mechanism 20 shapes a cylinder from the sheet-shaped film F fed from the film supply unit 11 mentioned above. The shaping mechanism 20 has a chute 21 and a former 22 as shown in FIGS. 2 and 3.

(3-1-1) Chute

The chute 21 functions as a passage for receiving articles C supplied from the combination weighing apparatus 2 and leading the articles C to the interior of the cylindrical film Fc. The chute 21 is a member that encloses an internal space for allowing the articles C to pass through. The chute 21 is integrated with the former 22, described hereinafter, via a bracket (not shown). The articles C measured out by the combination weighing apparatus 2 are dropped from an opening in the top of the chute 21 as shown in FIG. 2, and then the articles pass through the internal space of the chute 21 and fall into the cylindrical film Fc. The chute 21 mainly includes a funnel 211 and a tube 212. The funnel 211 and the tube 212 are integrally formed as a single member. The chute 21 can be made of a single sheet of metal or can be made of a plurality of sheet-like members, welded or otherwise fixed together to form the funnel 211 and the tube 212. Consequently, the chute 21 has a wall that has a cylindrical shape in the tube 212, but has diverging shape from the tube 212 upward along the funnel 211.

(a) Funnel

The funnel 211 constitutes the top of the chute 21. The funnel 211 has circular openings in the top and bottom ends. The top end opening is an entrance through which articles C fall, and the bottom end opening is an exit through which articles C are discharged. The funnel 211 comprises a receiving part 11a and a connecting part 11b. A support part 24 is attached to the chute 21. The funnel 211 also has slits 23 formed in the first portion of the chute 21.

(a-1) Receiving Part

The receiving part 11a is defined in a upper section of the funnel 211, and is shaped and dimensioned for receiving the articles C supplied from the combination weighing apparatus 2. The receiving part 11a has a transverse cross-sectional shape larger than the transverse cross-sectional shape of the tube 212 (the cross-sectional shape in the horizontal direction). In other words, the receiving part 11a has a cross-sectional area larger than the cross-sectional area of the tube 212. The receiving part 11a has a shape such that the cross-sectional area decreases progressively from the top end to the bottom end. In other words, the diameter of the cross section of the receiving part 11a decreases gradually downward. In the present embodiment, the inside diameter of the receiving part 11a decreases from the top to the bottom. Specifically, the diameter of the top end opening of the receiving part is 130 to 190 mm, and the diameter of the bottom end opening is 50 to 110 mm. The diameter of the bottom end opening is the minimum inside diameter of the chute 21. The internal space of the receiving part 11a is widest in the top end, the space narrows gradually downward, and the space is narrowest in the bottom end.

(a-2) Connecting Part

The connecting part 11b is positioned below the funnel 211, and is a portion connected to the tube 212. The transverse cross-sectional shape of the connecting part 11b is substantially equal to the transverse cross-sectional shape of the tube 212. The diameter of the connecting part 11b is, specifically, 50 to 110 mm.

(a-3) Support Part

The support part 24 is provided to the bottom part of the connecting part 11b and at the intersection of the funnel 211 and the tube 212. The support part 24 supports the pushing mechanism 30.

(a-4) Slits

In the funnel 211, a plurality of slits 23 are formed in the connecting part 11b and in proximity to the connecting part 11b, as shown in FIG. 3. Each slit 23 extends from an outer surface of the chute 21 to an inner surface of the chute 21. The connecting part 11b and the proximity of the connecting part 11b define a first portion enclosing or surrounding a first space. The first space is a space defined in the internal space of the chute 21, and is a location within the chute 21 where articles C readily get clogged. The first portion is a portion of the chute 21 where the inclination angle of the inner surface of the funnel 211 changes.

The slits 23 extend in a vertical direction. Specifically, the slits 23 are formed extending from the bottom part of the receiving part 11a to the connecting part 11b. The slits 23 are formed at predetermined intervals (uniform intervals) in the periphery of the funnel 211. Specifically, the slits 23 are formed at angular intervals of 120°, the reference being the center axis of the internal space of the funnel 211. The number of slits 23 formed in the funnel 211 corresponds to the number of pushing mechanisms 30 described hereinafter. Specifically, the slits 23 are formed in the first portion at equiangular intervals obtained by dividing 360° by the number of pushing mechanisms 30.

Figure 8:
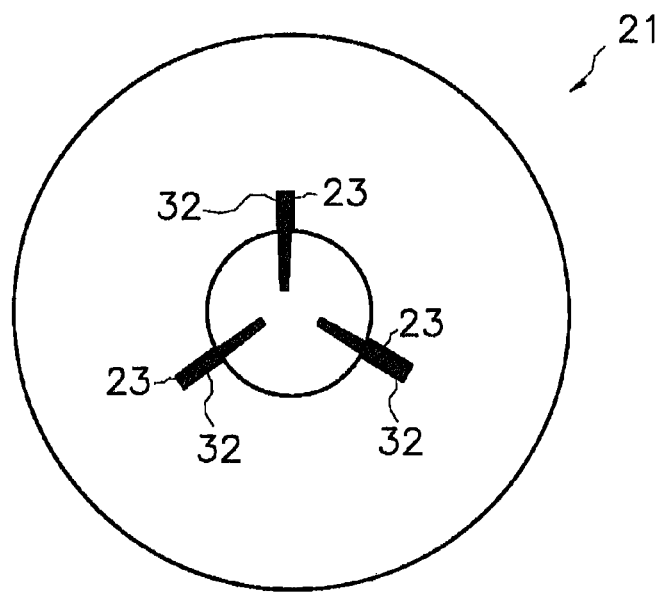
FIG. 8 is a plan view showing the rotating member and the chute interior when the motor is driven.

The slits 23 is an opening that allows rotating members 32, described hereinafter, to enter the first space (see FIGS. 8 and 11). Each of the slits 23 has an opening of a predetermined width w1 and a predetermined height h1. The width w1 and height h1 of the openings of the slits 23 are established based on the width w2 and height h2 of the side surface 32a of each rotating member 32. Specifically, the width w1 and height h1 of the openings of the slits 23 are slightly larger than the width w2 and height h2 of the side surfaces 32a of the rotating members 32 (w1>w2, h1>h2). In the present embodiment, the width w1 of the openings of the slits 23 is 2 mm to 4 mm. The height h1 of the openings of the slits 23 is 90 mm to 100 mm.

(b) Tube

The tube 212 constitutes the bottom part of the chute 21. The tube 212 is a cylindrical member extending vertically. The tube 212 has circular openings in the top and bottom ends. The opening in the top end receives articles C sent from the funnel 211. The opening in the bottom end discharges the articles C into the cylindrical film Fc. The diameters of the openings in the top and bottom ends are equal to the diameter of the opening in the bottom end of the funnel 211, which is the minimum diameter of the chute 21, 50 to 110 mm.

(3-1-2) Former

The former 22 is disclosed so as to encircle the chute 21. The shape of the former 22 is such that when the sheet-shaped film F fed from the film supply unit 11 passes through the gap between the former 22 and the chute 21, the film is shaped into a cylinder.

(3-2) Pushing Mechanism

The pushing mechanism 30 is an apparatus for resolving the clogging of articles C in the first space of the chute 21. As described above, the first space is a space in the internal space of the chute 21 where the articles C readily get clogged.

Figure 4:
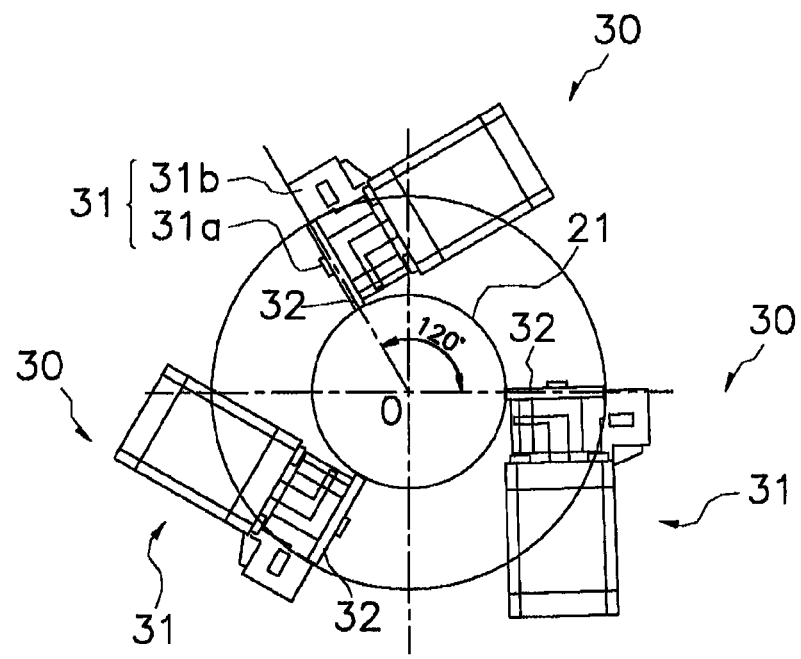
FIG. 4 is a plan view showing the placement of the pushing mechanism.
Figure 5:
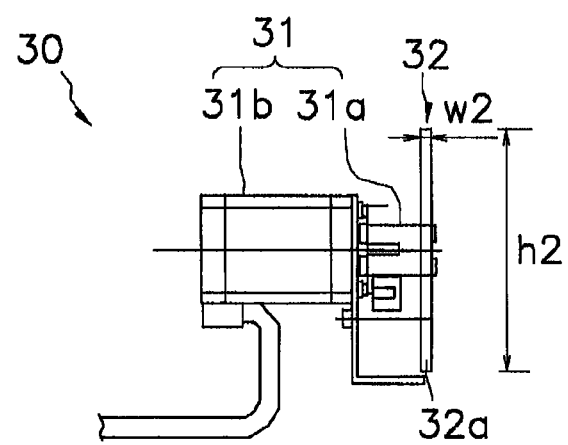
FIG. 5 is a side view of the pushing mechanism.

The pushing mechanism 30 is disposed in the bottom part of the receiving part 11a and the periphery of the connecting part 11b, as shown in FIGS. 2 and 3. Three pushing mechanisms 30 are disposed in the periphery of the chute 21 as shown in FIG. 4. The pushing mechanisms 30 are disposed at equiangular intervals around the periphery of the chute 21. Specifically, one pushing mechanism 30 is disposed at angular intervals of 120° from the other pushing mechanisms 30, the reference being the center axis O. The center axis O is an axis extending to the center of the internal space of the chute 21. The pushing mechanism 30 mainly comprises a rotation mechanism 31 and a rotating member (moving member) 32, as shown in FIGS. 4 and 5.

(3-2-1) Rotation Mechanism

The rotation mechanism 31 is a mechanism for rotatably supporting the rotating member 32, described hereinafter. The rotation mechanism 31 includes a rotating shaft 31a and a motor 31b. The rotating shaft 31a is provided to a center point P in the rotating member 32 (see FIG. 6). The rotating shaft 31a is rotated by the driving of the motor 31b. The motor 31b can be a stepper motor that can accurately rotate the rotating shaft 31a a predetermined number of rotations and can accurately stop rotation of the rotating shaft 31a a at the same arcuate location, if desired based upon signals from the control unit 7.

(3-2-2) Rotating Member

The rotating member 32 is a member rotated by the driving of the rotation mechanism 31 and thereby moved from the outside of the chute 21 to the inside of the chute 21. The rotating member 32 is a plate-shaped member. The plate-shaped member is configured from a first surface (side surface) 32a and a second surface (front surface and rear surface) 32b.

As shown in FIG. 5, the first surface 32a is rectangular. The first surface 32a has a predetermined width w2 and a predetermined height h2. Specifically, the width w2 of the first surface 32a is 1.5 to 2.5 mm, and the height h2 of the first surface 32a is 85 to 95 mm.

The second surface 32b is a surface adjacent to the first surface 32a. The second surface 32b is point-symmetrical with reference to the center point P as shown in FIG. 6. The second surface 32b is configured by two sides L1 and two sides L2. The two sides L1 are in point-symmetrical positions with reference to the center point P. The two sides L2 are also in point-symmetrical positions with reference to the center point P. The sides L1 have the same incline relative to a horizontal plane as the outer wall (inner wall) of the receiving part 11a. The sides L2 have the same incline relative to a horizontal plane as the outer wall (inner wall) of the connecting part 11b. Specifically, the second surface 32b has sides L1, L2 along the outer shape of the chute 21. The angle θ1° formed by the sides L1, L2 is the same angle as the external angle θ2° of the wall surfaces of the receiving part 11a and the connecting part 11b. The length dimension of the sides L1 must be 50% or more of the radius of the first space. Preferably, the length dimension of the sides L1 is 60% or more of the radius of the first space, and more preferably 70% or more. Specifically, to reliably resolve the clogging of the articles C, the sides L1 are made as long as possible, provided there is no collision with the other rotating members. In the present embodiment, the length dimension of the sides L1 is 30 to 50 mm. The width dimension w3 of the longitudinal center of the second surface 32b is greater than the width dimension w4 of the longitudinal ends.

The rotating shaft 31a is attached to the center point P of the rotating member 32 as described above. The rotating member 32 is rotated about a horizontal axis with reference to the center point P, due to the rotation of the rotating shaft 31a (see FIGS. 6 and 11). The rotating member 32 either enters the first space or withdraws from the first space by rotating 180° about the horizontal axis. Specifically, the rotating member 32 is rotated by the rotation mechanism 31 and made to protrude into the interior of the chute 21. At this time, the first surface 32a moves from the top to the bottom of the internal space of the chute 21. When articles C have become clogged inside the chute 21, the first surface 32a moving through the internal space of the chute 21 contacts the clogged articles C (see FIG. 11).

Rotation of the rotating member 32 is controlled by the control unit 7 such that the rotating member 32 is stopped and waits at a stopped position before the rotation mechanism 31 is driven. The stopped position is a position where the rotating member 32 is stopped by the controlling operations of the control unit 7 and the motor 31b. The rotating member 32 blocks the opening of the slit 23 at the stopped position (see FIG. 6). Specifically, the rotating member 32 blocks 50% or more of the open area of the slit 23 by the first surface 32a. In further detail, when the rotating member 32 is in the stopped position, the first surface 32a constitutes part of the inner wall of the chute 21 (see FIG. 7). Specifically, the first surface 32a is in a position of having moved toward the inside of the chute 21 from the outer wall of the chute 21 in proportion to the depth of the slit 23 (the thickness of the chute 21). Preferably, the first surface 32a is in a position along the inner wall of the chute 21. In other words, the rotating member 32 does not protrude into the interior of the chute 21 while the rotation mechanism 31 is not being driven by the control unit 7.

(3-3) Pull-Down Belt Mechanism

The pull-down belt mechanism 40 is disposed in bilateral symmetry about the tube 212 as shown in FIG. 2. The pull-down belt mechanism 40 extends along the vertical direction of the tube 212. The pull-down belt mechanism 40 conveys the cylindrical film F downward while sucking the film which is wound around the tube 212. The pull-down belt mechanism 40 is configured to comprise a drive roller 41, a driven roller 42, a belt 43 having a chucking function, and other components.

(3-4) Longitudinal Sealing Mechanism

The longitudinal sealing mechanism 50 also extends in the vertical direction along the tube 212 as shown in FIG. 2. The longitudinal sealing mechanism 50 is a mechanism for heating and longitudinally sealing the overlapping portion of the cylindrical film Fc wound around the tube 212 while pressing this portion against the tube 212 with a certain amount of pressure. The longitudinal sealing mechanism 50 has mainly a heater and a heater belt. The heater belt is heated by the heater, and the heater belt comes in contact with the overlapping portion of the cylindrical film Fc.

(3-5) Shutter Mechanism

The shutter mechanism 60 is disposed below the shaping mechanism 20 and the longitudinal sealing mechanism 50 and above the transverse sealing mechanism 70 described hereinafter, as shown in FIG. 2. The shutter mechanism 60 is a mechanism for suppressing the embedding of the articles C in a location to be sealed formed by the transverse sealing mechanism 70 described hereinafter, and the shutter mechanism has a pair of shutter members. The pair of shutter members are disposed in front and behind of the cylindrical film Fc. By repeating a first action and a second action, the shutter mechanism 60 prevents the articles C from being embedded in the location to be sealed. The first action is an action wherein the shutter members descend a predetermined distance while sandwiching the cylindrical film Fc. The second action is an action wherein the shutter members move away from the cylindrical film Fc and then move back toward the cylindrical film Fc to sandwich the cylindrical film Fc. The shutter members sandwich the cylindrical film Fc earlier than seal jaws 71, 71 of the transverse sealing mechanism 70 described hereinafter, and suppress the falling of packaged goods above the location to be sealed when the cylindrical film Fc is transversely sealed.

(3-6) Transverse Sealing Mechanism

The transverse sealing mechanism 70 is a mechanism for sealing the cylindrical film Fc in the width direction (transverse direction) of the cylindrical film Fc and forming a top seal part and a bottom seal part of the bag B. The transverse sealing mechanism 70 is disposed below the shaping mechanism 20, the pull-down belt mechanism 40, the longitudinal sealing mechanism 50, and the shutter mechanism 60, as shown in FIG. 2.

The transverse sealing mechanism 70 primarily comprises a pair of seal jaws 71, 71 housing a heater. The pair of seal jaws 71, 71 move toward and away from each other in synchronization with the tube 212 as an axis. The seal jaws 71, 71 sandwich the cylindrical film Fc when nearest to each other. The part to be sealed of the cylindrical film Fc sandwiched by the seal jaws 71, 71 is heat sealed by the heaters housed therein. A top seal part of the bag B and a bottom seal part of the successive cylindrical film Fc are thereby formed. A cutter (not shown) is housed in one seal jaw 71, and the middle of the region heat sealed by one sandwiching action is cut in the transverse direction by the cutter. The bag B is thereby cut away from the cylindrical film Fc extending in the longitudinal direction.

(4) Control Unit

Figure 9:
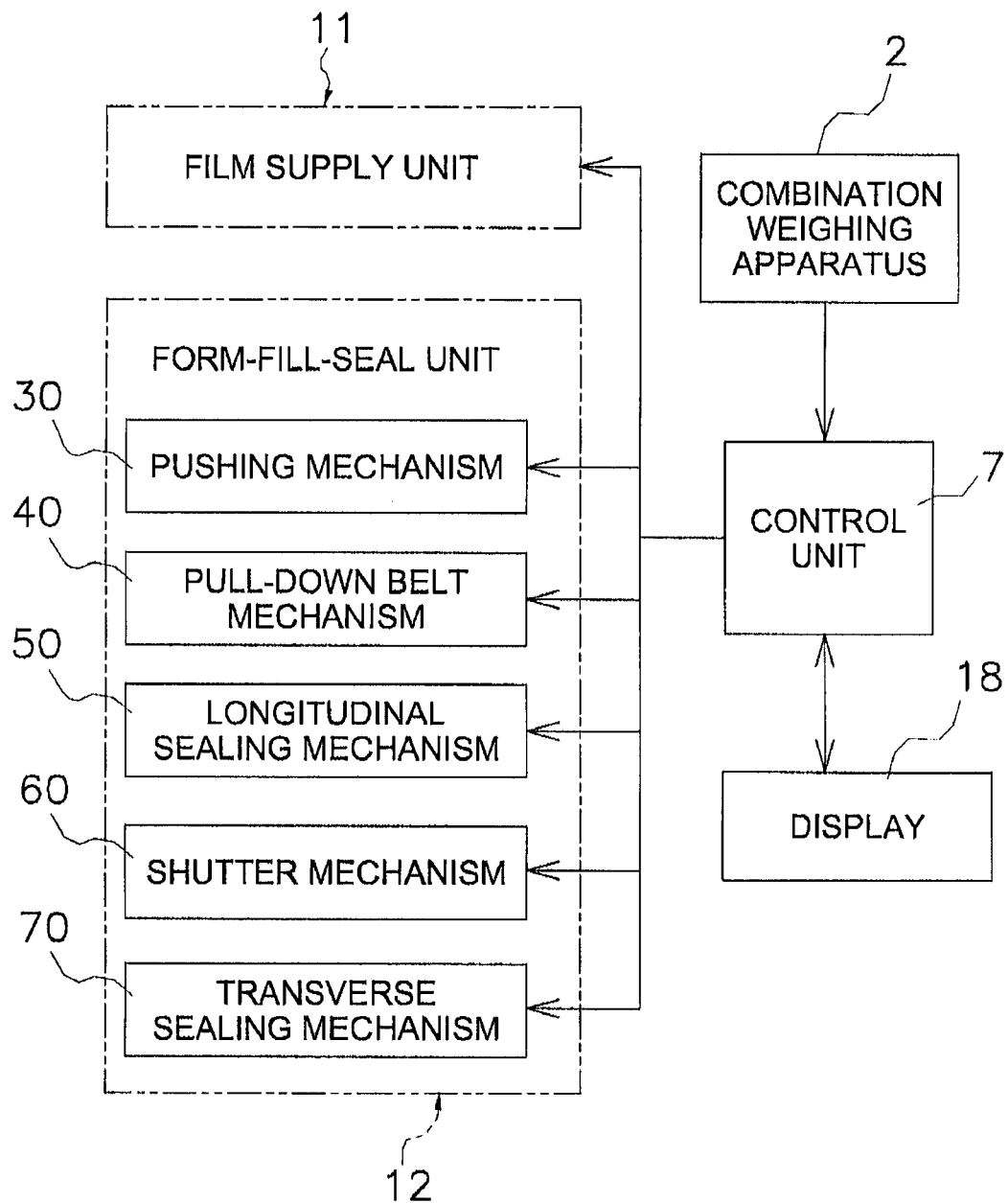
FIG. 9 is a control block diagram.

The control unit 7 comprises a CPU, ROM, RAM, a hard disk, and other components, and the control unit reads and executes programs for controlling the components of the form-fill-seal machine 10. The control unit 7 is electronically connected (operably connected) with the display 18, the film supply unit 11, the pushing mechanism 30, the pull-down belt mechanism 40, the longitudinal sealing mechanism 50, the shutter mechanism 60, and the transverse sealing mechanism 70, as shown in FIG. 9. Information relating to the timing whereby the articles C are supplied by the combination weighing apparatus 2 is also sent to the control unit 7. The control unit 7 is configured to synchronize the operation of the rotation mechanism 31 (and the rotating member 32) with operation of the combination weighing apparatus 2, as described below.

Based on various settings received by the display 18 and the information sent from the combination weighing apparatus 2, the control unit 7 transmits control commands for the various units and mechanisms. The drive components of the various units and mechanisms are driven based on the control commands sent from the control unit 7. The control unit 7 also acquires and stores a variety of information from the various units and mechanisms within a short amount of time. Based on the acquired information, the control unit 7 causes the display 18 to display operation information and the like.

(5) Action of Form-Fill-Seal Machine (5-1) Overall Flow

The film F is supplied from the film supply unit 11. The film F is fed to the form-fill-seal unit 12 while in a state of being wrapped over a plurality of guide rollers and/or dancer rollers (not shown). The film F is passed through the shaping mechanism 20 and shaped into the cylindrical film Fc. The longitudinal sealing mechanism 50 then heat seals the overlapping portion of the cylindrical film Fc. The cylindrical film Fc is then transversely sealed by the transverse sealing mechanism 70. The transversely sealed location is then cut by the cutter, and the bag B is cut away from the upstream cylindrical film Fc.

(5-2) Control of Pushing Mechanisms

Figure 10:
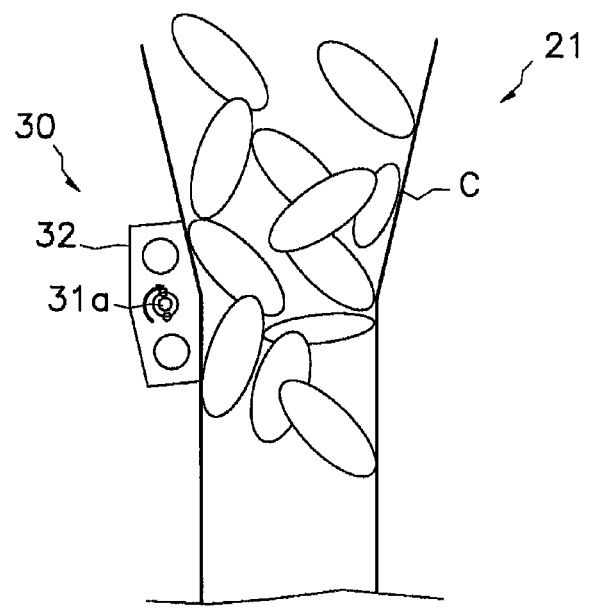
FIG. 10 is a drawing for describing the control of the pushing mechanism.
Figure 11:
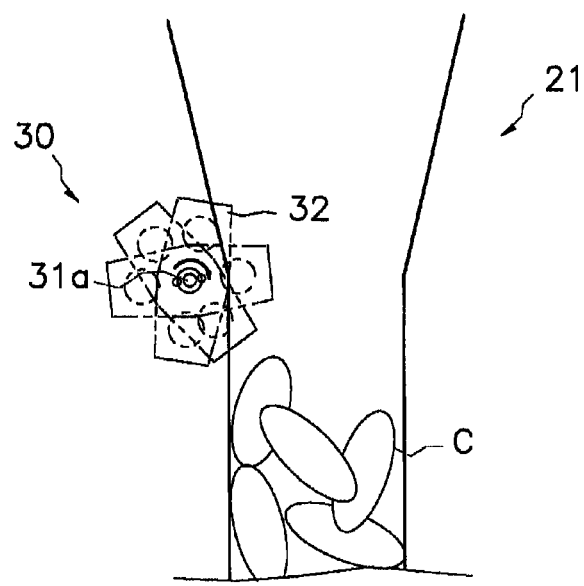
FIG. 11 is a drawing for describing the control of the pushing mechanism.

Next, FIGS. 10 and 11 are used to describe the control of the pushing mechanisms 30 by the control unit 7. FIG. 10 shows a case in which a pushing mechanism 30 is not being driven and the rotating member 32 is in the stopped position. FIG. 11 shows a state in which the pushing mechanism 30 is driven, and the rotating member 32 enters into and then withdraws from the chute 21. FIGS. 10 and 11 show only the motion of a rotating member 32 associated with one pushing mechanism 30, but the other pushing mechanisms 30, 30 are driven in the same manner. The control unit 7 actuates or stops the rotating member 32 by switching the motor 31*b* of the rotation mechanism 31 between ON and OFF.

(5-2-1) During Non-Driving

Figure 7:
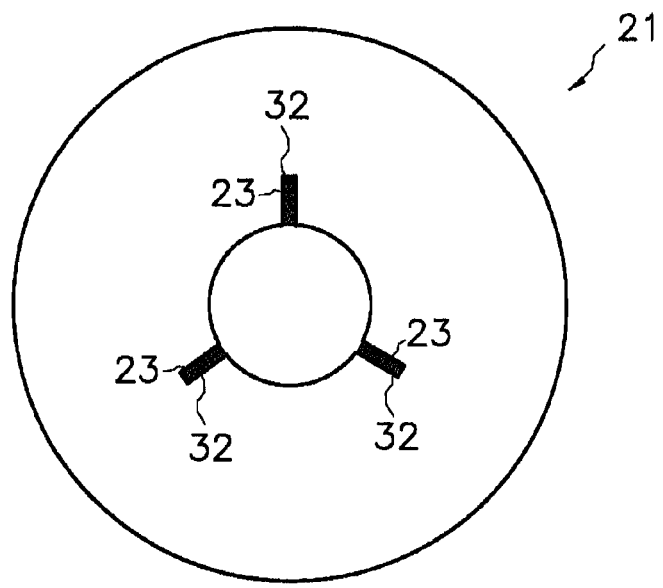
FIG. 7 is a plan view showing the rotating member and the chute interior when the motor has stopped.

The control unit 7 sets the motor 31*b* to OFF while the articles C are falling into the chute 21. When the control unit 7 has set the motor 31*b* to OFF, the control unit 7 causes the rotating member 32 to wait in the stopped position and maintains the orientation of the rotating member 32 (the first process), as shown in FIG. 10. The orientation of the rotating member in the stopped position is an orientation such that the sides L1, L2 of the second surface 32*b* coincide with the inner wall surface of the chute 21. Specifically, the first surface 32*a* constitutes part of the inner wall of the chute 21 as shown in FIG. 7. At this time, the rotating member 32 blocks the largest amount of the open area in the slit 23, in comparison with other orientations. Specifically, when the pushing mechanism 30 is not being driven, the rotating member 32 functions as a blocking member for the slit 23.

(5-2-2) During Driving

The control unit 7 sets the motor 31*b* to ON in accordance with the timing whereby the articles C are supplied from the combination weighing apparatus 2. When the control unit 7 has set the motor 31*b* to ON, the rotating member 32 rotates about a horizontal axis as shown in FIG. 11. The orientation of the rotating member 32 thereby fluctuates. Specifically, the control unit 7 drives the motor 31*b* after a predetermined time has expired following the supply of the articles C from the combination weighing apparatus 2. The predetermined time is a time lasting until the articles C supplied from the combination weighing apparatus 2 pass through the first space of the chute 21. The control unit 7 drives the rotation mechanism 31 and causes the rotating member 32 to enter the interior of the chute 21 at the timing in which the articles C have passed through the first space of the chute 21. When the pushing mechanism 30 is being driven, the rotating member 32 functions as a member for resolving clogging of the articles C.

The control unit 7 rotates the rotating member 32 by 180° every time a cluster of articles C is supplied from the combination weighing apparatus 2 (with each cycle). At the timing in which one cluster of the articles C has passed through the first space, the rotating member 32 enters the first space and then withdraws from the first space as shown in FIG. 11. When the rotating member 32 has rotated 90°, the rotating member maximally protrudes into the interior of the chute 21 (see FIG. 8). When the rotating member 32 has rotated 90°, the length dimension of the rotating member 32 protruding into the interior of the chute 21 is 50% or more of the radius of the first space. When the rotation angle of the rotating member 32 is between 0° and 90°, the amount by which the rotating member 32 protrudes into the interior of the chute 21 increases as the rotation angle increases. When the rotation angle is between 90° and 180°, the amount by which the rotating member 32 protrudes into the interior of the chute 21 decreases as the rotation angle increases.

(6) Characteristics (6-1)

In the form-fill-seal machine 10 according to the above embodiment, slits 23 are formed in the portion (the first portion) of the chute 21 that encloses the first space where the articles C readily become clogged. After the articles C have passed through the first space, the rotating members 32 enter the first space through the slits 23. Specifically, because the rotating members 32 disposed in proximity to the first space are made to enter the first space, control for resolving the clogging the chute 21 interior can be executed in a short amount of time.

Considered possibilities for improving the manufacturing cycle of the bags B by the form-fill-seal machine 10 include increasing the operating speed of the mechanisms constituting the form-fill-seal machine 10, and shortening the time intervals at which the articles C are supplied by the combination weighing apparatus 2. However, in conventionally proposed form-fill-seal machines, pushing members are made to protrude into the chute from the top to resolve clogging of the articles C in the chute interior. The pushing members protrude into the chute from the top of the chute by swinging, and force the articles clogged in the chute to fall into the cylindrical film. However, when the pushing members are configured to protrude into the chute interior from the top of the chute, the pushing members take time to be driven (to move back and forth). Specifically, time is needed for the pushing members to protrude into the chute interior from the top of the chute, and also for the pushing members to be taken out of the chute interior. As a result, it is difficult to operate the form-fill-seal machine with a high capability. In other words, it is not possible to manufacture numerous bags B in a certain amount of time.

In the form-fill-seal machine 10 according to the above embodiment, the rotating members 32 for resolving clogging inside the chute 21 enter into the chute 21 through the slits 23. The slits 23 are formed in the portion (the first portion) of the chute 21 that encloses the first space. Clogging of the articles C in the interior of the chute 21 can thereby be reduced, and the form-fill-seal machine 10 can be operated with a high capability.

(6-2)

Furthermore, in the form-fill-seal machine 10 according to the above embodiment, the rotating members 32 are rotated in one direction by the rotation mechanisms 31. The rotating members 32 enter the first space and then withdraw from the first space by rotating in one direction. The rotating members 32 can thereby enter into the first space and withdraw from the first space in a short amount of time. As a result, the performance of the form-fill-seal machine 10 can be further improved.

(6-3)

Conventional form-fill-seal machines have been provided with long pushing members so that the pushing members can come in contact with portions prone to clogging. Because the pushing members are swung, the long pushing members require a large installation space in order for them to be swung.

On the other hand, in the form-fill-seal machine 10 according to the above embodiment, the slits 23 are formed in the first portion. The first portion is the connecting part 11b and the proximity of the connecting part 11b, and is a portion that encloses the first space where the articles C readily clog as described above. In the form-fill-seal machine 10, the rotating members 32 are rotated and made to enter the first space through the slits 23. The length dimension of the sides L1 of the rotating members 32 is based on the inside diameter (the radius) of the first space. Consequently, a large space is not required for installing the pushing mechanisms 30. Furthermore, because the rotating members 32 enter through the slits 23 formed in the portion enclosing the first space, the rotating members 32 can be moved in a short amount of time into the portion where the articles C clog readily inside the chute 21.

(6-4)

The form-fill-seal machine 10 according to the above embodiment causes the orientation of the rotating members 32 to fluctuate and resolves clogging of the articles C at the timing in which the articles C have passed through the first space. For the rest of the time, the rotating members 32 are kept in the stopped position to block the slits 23. Scattering of the articles C out of the chute 21 through the slits 23 can thereby be suppressed.

(6-5)

The form-fill-seal machine 10 according to the above embodiment has a plurality of pushing mechanisms 30 provided around the periphery of the chute 21. Specifically, the plurality of rotating members 32 protrude into the interior of the chute 21 from multiple locations. Clogging of the articles C can thereby be reliably resolved by rotating members 32 protruding from multiple locations.

(6-6)

In the above embodiment, the rotating members 32 are plate-shaped members having side surfaces (first surfaces) and front and rear surfaces (second surfaces). The second surfaces are configured to comprise two sides L1, L2 having the same incline as the outer wall (inner wall) of the chute 21 relative to a horizontal plane. Consequently, the rotating members 32 in the stopped position do not hinder the passage of articles C in the interior of the chute 21.

In the above embodiment, the length dimension of the sides L1 of the rotating members 32 must be 50% or more of the radius of the first space in order to reliably resolve clogging of the articles C. The greater the length dimension of the sides L1 relative to the radius, the better. When the length dimension of the sides L1 increases, the height h1 dimension of the slits 23 also increases. Consequently, there is a greater possibility that the articles C will scatter out of the chute 21 through the slits 23. However, in the above embodiment, the rotating members 32 in the stopped position function as blocking members for the slits 23 even when the height h1 dimension of the slits is large. Consequently, scattering of the articles C can be effectively reduced.

(6-7)

In the above embodiment, the rotating members 32 are point-symmetrical plate-shaped members. The rotating shafts 31a are attached to the center points P of the rotating members 32, and the rotating members 32 rotate about horizontal axes based on the center points P. When the rotation mechanisms 31 begin driving, the rotating members 32 immediately enter the first space, and the clogging resolution operation can be executed. Consequently, the time lag from the start of the driving of the pushing mechanisms 30 until clogging resolution can be reduced.

The rotating members 32 return to the stopped position by rotating 180° based on the center points P, and block the slits 23 in the stopped position. The time duration needed for one operation cycle of the pushing mechanisms 30 can thereby be reduced. As a result, the performance of the form-fill-seal machine 10 can be further improved.

(6-8)

In the above embodiment, the control unit 7 drove the rotation mechanisms 31 in the timing in which the articles C passed through the first space of the chute 21. Clogging of the articles C can thereby be resolved, and from the batch of the articles C supplied from the combination weighing apparatus 2, the articles C that pass later through the first space can be helped to fall.

(6-9)

The form-fill-seal machine 10 according to the above embodiment is used together with the combination weighing apparatus 2 as shown in FIG. 1. The combination weighing apparatus 2 measures the articles C using hoppers, and determines the combination of hoppers whereby the total value will reach a predetermined weight, as described above.

In cases such as that of a conventional form-fill-seal machine, wherein clogging of the articles C inside the chute 21 is resolved using swinging pushing members, the form-fill-seal machine is shaken by the swinging of the pushing members. The shaking of the form-fill-seal machine is transferred to the combination weighing apparatus disposed above the form-fill-seal machine. As a result, there are cases in which the measuring-out accuracy of the combination weighing apparatus is adversely affected.

However, the form-fill-seal machine 10 according to the above embodiment has a configuration in which clogging of the articles C is resolved by rotating the rotating members 32. Consequently, the vibration imparted to the combination weighing apparatus 2 can be reduced to a greater extent than with a configuration involving swinging. The measuring-out accuracy of the combination weighing apparatus 2 can thereby be maintained.

(7) Modifications (7-1) Modification A

In the above embodiment, the rotating members 32 are rotated 180° every time a batch of the articles C is supplied from the combination weighing apparatus 2, but the rotating members 32 may be configured to be rotated 360° in a single operation. In this case, the capability of the form-fill-seal machine 10 decreases, but clogging of the chute 21 can be more reliably resolved.

(7-2) Modification B

The pushing mechanisms 30 according to the above embodiment may also have photosensors. The photosensors determine misalignment in the stopped positions of the rotating members 32. The configuration may be such that when misalignment in the stopped position of the rotating members 32 has been determined by the photosensors, the control unit 7 drives the rotation mechanisms 31 and regulates the rotating members 32 so as to hold them in the stopped positions. The stopped positions of the rotating members 32 can thereby be suitably adjusted even in cases in which precise control of the rotating members 32 by the rotation mechanisms 31 is not possible.

(7-3) Modification C

Figure 12:
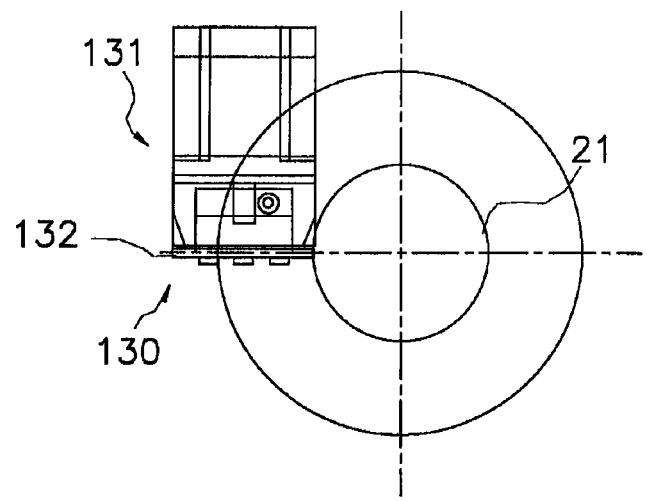
FIG. 12 is a plan view showing the placement of the pushing mechanism according to Modification C.
Figure 13:
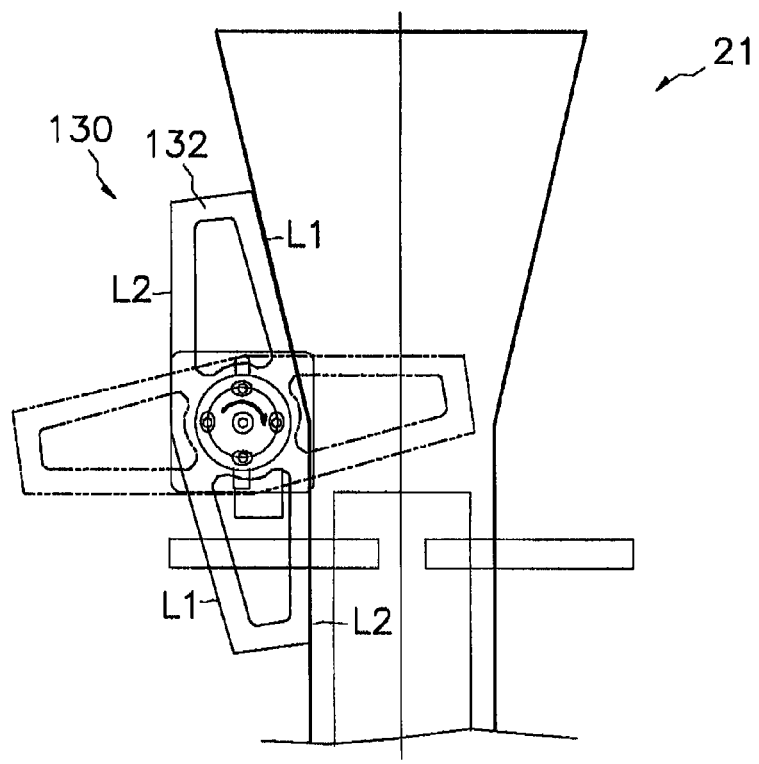
FIG. 13 is a drawing showing the rotating member according to Modification C.

In the above embodiment, three pushing mechanisms 30 were installed around the periphery of the chute 21. Instead of three pushing mechanisms 30, one pushing mechanism 130 may be installed as shown in FIG. 12. The pushing mechanism 130 has a rotation mechanism 131 and a rotating member 132, similar to the pushing mechanisms 30. The configurations of the rotation mechanism 131 and the rotating member 132 are similar to the configurations of the rotation mechanisms 31 and the rotating members 32. The length dimension of the sides L1 of the rotating member 132 is greater than the length dimension of the sides L1 of the rotating members 32 (see FIG. 13). For example, the length dimension of the sides L1 of the rotating member 132 is preferably a length dimension 80% or more of the diameter of the first space. The slits 23 are formed in accordance with the length dimensions L1 and L2 of the rotating member 132. Clogging of the articles C inside the chute 21 can thereby be resolved even with a single pushing mechanism 130.

The number of the pushing mechanisms 30 provided around the periphery of the chute 21 is not limited to three. For example, two or four pushing mechanisms 30 may be provided. When a plurality of pushing mechanisms 30 are provided around the periphery of the chute 21, the pushing mechanisms 30 are preferably disposed at equiangular intervals around the periphery of the chute 21.

(7-4) Modification D

In the above embodiment, the openings of the chute 21 are circular, but the openings of the chute 21 may be rectangular. Specifically, the openings of the funnel 211 and the tube 212 constituting the chute may both be rectangular.

What is claimed is:

1. A packaging apparatus comprising:
   a shaping mechanism that at least partially forms a packaging material into a package;
   a chute coupled to the shaping mechanism and defining a passage space that directs items from an upper end of the chute to a lower end of the chute where the items are fed into the package at least partially formed mechanism, the items being supplied from an upper apparatus into the passage space, the chute having a first portion located between the upper end and the lower end with a slit formed therein, the first portion surrounding a first space where the items to be packaged readily become clogged, the first space defining part of the passage space;
   a moving member coupled to an exterior surface of the first portion for movement into the first space and out of the first space through the slit;
   a control unit operably connected to the moving member controlling movement of the moving member into the first space after the items targeted to be packaged have passed through the first space; and
   a rotation mechanism rotatably supporting the moving member, the rotation mechanism selectively rotating the moving member in a first direction such that the moving member enters the first space and withdraws from the first space in response to signals from the control unit,
   the moving member bein a plate-shaped member having a front surface, a rear surface and a first side surface dimensioned to block the slit with the moving member in a stopped position, the front surface and the rear surface having one side along the outer contour of the chute,
   the rotation mechanism rotating the moving member about the longitudinal direction center of the plate-shaped member, and
   the control unit is configured to selectively operate the rotation mechanism such that the moving member is moved into and out of the first space, and the control unit is configured to cease operation of the rotation mechanism such that the moving member is maintained in the stopped position.

2. The packaging apparatus according to claim 1, wherein the chute having a funnel part and a cylindrical part that extend in a vertical direction, the funnel part being connected to the cylindrical part with a connecting part defined proximate an intersection of the cylindrical part and the funnel part, the funnel part defining a receiving part for receiving the items to be packaged supplied from the upper apparatus, the receiving part having a larger cross-sectional area than the cylindrical part, the slit being formed in the first portion and extending vertically along the connecting part.

3. The packaging apparatus according to claim 2, wherein the funnel part of the chute has an inclination angle such that an upper end of the funnel part has a larger diameter than a lower end of the funnel part; and
   the first portion is a section of the chute where the inclination angle of an inner surface of the funnel part changes to mate with the cylindrical part.

4. The packaging apparatus according to claim 1, wherein the slit is an opening in the first portion that extends from an outer surface of the chute to an inner surface of the chute, and
   the moving member and the rotation mechanism are configured such that in the stopped position, the moving member blocks 50% or more of the opening of the slit.

5. The packaging apparatus according to any of claim 1, wherein
   the first portion is provided with a plurality of slits, and
   a plurality of the moving members are provided along an outer periphery of the chute corresponding to the plurality of slits.

6. The packaging apparatus according to claim 1, wherein the moving member is the plate-shaped member, the side surface thereof adapted for blocking the slit with the moving member in the stopped position and the front and rear surfaces thereof having a point-symmetrical shape as an outer contour,
   the rotational center of the rotation mechanism is provided to the center point of the point-symmetrical shape of the plate-shaped member; and
   the rotation mechanism is operable to rotate the moving member 180°.

* * * * *